United States Patent [19]

Walling et al.

[11] Patent Number: 5,230,919

[45] Date of Patent: * Jul. 27, 1993

[54] COMPOSITION AND PROCESS OF MAKING FLUID, REDUCED FAT PEANUT BUTTERS AND IMPROVED WHIPPED PEANUT BUTTERS

[75] Inventors: David W. Walling, Cincinnati, Ohio; John W. Theis, III, Lexington, Ky.; Vincent Y.-L. Wong, West Chester, Ohio; Phillip F. Pflaumer, Hamilton, Ohio; Robert E. Tarr, Cincinnati, Ohio; Larry O. Seward, Cincinnati, Ohio; Richard J. Sackenheim, Hamilton, Ohio; Margo A. Bagley, Orlando, Fla.; Mark D. Theurer, Cincinnati, Ohio

[73] Assignee: The Procter & Gamble Company, Cincinnati, Ohio

[*] Notice: The portion of the term of this patent subsequent to Jan. 7, 2009 has been disclaimed.

[21] Appl. No.: 862,085

[22] Filed: Apr. 2, 1992

Related U.S. Application Data

[63] Continuation-in-part of Ser. No. 698,421, May 10, 1991, abandoned.

[51] Int. Cl.$^5$ .............................................. A23L 1/38
[52] U.S. Cl. .................................. 426/633; 426/518; 426/564; 426/604
[58] Field of Search ................. 426/564, 633, 518, 604

[56] References Cited

U.S. PATENT DOCUMENTS

| | | |
|---|---|---|
| 1,921,275 | 8/1933 | Werner . |
| 1,926,369 | 9/1933 | Brown . |
| 2,003,415 | 6/1935 | Ammann . |
| 2,511,115 | 6/1950 | Lazier et al. . |
| 2,834,682 | 5/1958 | Zuckerman . |
| 2,976,154 | 3/1961 | Brown et al. . |
| 3,115,412 | 12/1963 | Schoppe et al. . |
| 3,317,325 | 5/1967 | Durst . |
| 3,619,207 | 11/1971 | Dzurik et al. ........................ 99/128 |
| 4,000,322 | 12/1976 | Billerback et al. .................. 426/72 |
| 4,004,037 | 1/1977 | Connick ............................. 426/324 |
| 4,273,795 | 6/1981 | Bosco et al. ....................... 426/604 |
| 4,329,375 | 5/1982 | Holloway, Jr. et al. ........... 426/632 |
| 4,364,967 | 12/1982 | Black ................................. 426/632 |
| 4,466,987 | 8/1984 | Wilkins et al. ..................... 426/632 |
| 4,639,374 | 1/1987 | Matsunoby et al. ................ 426/43 |
| 4,814,195 | 3/1989 | Yokohama et al. ............... 426/633 |
| 4,828,868 | 5/1989 | Lasdon et al. ..................... 426/633 |
| 4,871,566 | 10/1989 | Farum et al. ...................... 426/632 |
| 4,891,235 | 1/1990 | Mizuguchi et al. ................ 426/281 |
| 4,938,987 | 7/1990 | Gannis et al. ..................... 426/632 |
| 4,966,074 | 2/1991 | Seiden et al. ...................... 426/601 |
| 5,079,027 | 1/1992 | Wong et al. ....................... 426/633 |

FOREIGN PATENT DOCUMENTS 349040 1/1990 European Pat. Off. .
2007961 5/1979 United Kingdom .

*Primary Examiner*—Jeanette Hunter
*Assistant Examiner*—Helen F. Pratt
*Attorney, Agent, or Firm*—Gary M. Sutter; Eric W. Guttag; Tara M. Rosnell

[57] ABSTRACT

The invention is a reduced past nut or oilseed butter composition made from roasted nuts which contains: (a) from about 40% to about 67% nut solids, between 65% and 80% of said solids having a particle size less than 18 microns and a SPAN of greater than 2.5 and not more than 5.0; (b) from about 33% to about 45% oil; (c) from 0% to about 4% stabilizer; (d) from 0% to about 40% bulking agent; (e) from 0% to about 8% flavorant; and (f) from 0% to about 3% emulsifier; where the product has a Casson plastic viscosity of between 1 and 15 poise and a yield value below 300 dynes per square centimeter. The invention also relates to a reduced fat or full compositions of the general type described above which is whipped to contain dispersed gas bubbles, where at least 90% of the bubbles have a diameter less than 150 microns. Processes for making these compositions are also described.

60 Claims, No Drawings

COMPOSITION AND PROCESS OF MAKING FLUID, REDUCED FAT PEANUT BUTTERS AND IMPROVED WHIPPED PEANUT BUTTERS

CROSS REFERENCE TO RELATED APPLICATIONS

This is a continuation-in-part of application Ser. No. 07/698,421, filed on May 10, 1991 and now abandoned.

TECHNICAL FIELD

This invention relates to improved peanut butters, preferably to reduced fat peanut butters, and most preferably to whipped (aerated) reduced fat peanut butters. The invention provides a fluid, reduced fate peanut butter with a bimodal particle size distribution (PSD). The invention also provides a whipped peanut butter with superior appearance and aeration stability.

BACKGROUND OF THE INVENTION

Conventional peanut and other nut butters consist of a mixture of solid nut particles, liquid oil, and flavorants, e.g. a sweetener such as sugar, high fructose corn syrup or honey, and salt. Peanut butter is made by roasting raw peanut kernels and then blanching and grinding them. The comminuted nut particles are suspended in the oil from the nut (of added oil) to form a product having a pasty and spreadable consistency. In time, however, part of the oil separates from the product and forms a separate layer on the top of the peanut butter and a rigid crumbly mass underneath. This tendency of peanut butter to separate on standing can be overcome to some extent by the use of stabilizers. Stabilizers are generally partially hydrogenated or highly hydrogenated fats and oils or other emulsifiers.

Peanut butters typically contain about 50% oil and about 50% solids. The stabilizer is usually added at a level of 0.5% to 3% by weight. Flavorants such as salt, sugar and molasses can be added to improve the flavor. Emulsifiers are usually added to reduce stickiness.

The spreadability and perceived stickiness (tendency of the peanut butter to adhere to stick to the roof of one's mouth and its resistance to breakdown during chewing) are highly sensitive to the fat content of peanut butter. The lower the fat content, the harder the product is to spread and the greater is the stickiness perception. Consequently, reduction of the fat content by 25% or more (to about 37% of the peanut butter) while maintaining acceptable texture has not been achieved.

Analysis of current (full fat) peanut butter products shows the particle size distribution of the peanut solids to be primarily two different ranges. One distribution curve is composed of particles in the range of from about 18 to about 118 microns, with the central portion of the distribution being between about 24 and 118 microns in size. The second particle size distribution range is primarily between about 3 microns and about 14 microns with the major distribution being between 5 microns and 11 microns. This distribution is bimodal, i.e., two distribution curves which overlap.

Work by Wong et al. defined fluid low fat nut butters with monodispersed PSD. See European patent application no. 0381259, published Aug. 8, 1990 and corresponding U.S. Pat. No. 5,079,027 issued Jan. 7, 1992. Their process utilized a roll milling operation to prepare the defatted peanut solids. These monodispersed solids have a particle size in which the major distribution (80% or more) of particles is a single particle size range of 18 microns or less, and preferably wherein 90% of the particles are less than 13 microns. Combining these solids with oil and additional ingredients (i.e., flavorants, stabilizers, emulsifiers) produced a fluid low fat peanut butter.

In contrast to Wong et al., the present invention defines a fluid, low fat nut butter with a bimodal PSD. Peanut butter products having a bimodal particle size distribution exhibit improved flavor compared to products having monodispersed particle size distribution. However, until now, it was not possible to achieve a combination of bimodal particle distribution and desirable fluidity for reduced fat peanut butters.

The process of the present invention utilizes novel defatted peanut solids which are combined with conventionally ground (full fat) peanuts under high shear mixing conditions. The novel defatted peanut solids are extruded or processed using a combination of milling (e.g. roll mill) and high shear mixing (e.g. Readco mixer) operations. These steps result in a reduced fat peanut butter with a significantly lower viscosity than obtained via roll milling along. Extruded defatted peanuts can also be optionally subjected to high shear mixing to further reduce the viscosity. The combination of these extruded or roll milled solids with ground, full-fat peanut paste in a high shear fluid mixing operation (i.e. colloid milling) results in the novel reduced fat peanut paste which displays a bimodal PSD. This is beneficial for several reasons, including the economic benefit from only defatting a portion of the total peanut stream required for the reduced fat product, and the peanut flavor benefit derived from same.

Furthermore, previous attempts at whipped or aerated peanut butters have generally resulted in poor appearance (large, visible bubbles) and poor stability of the aerated system, where bubbles grow or coalesce over time and/or the product will collapse or deaerate. We have not discovered that removal of oil (fat) from the system improves the stability of whipped peanut butters.

The present invention also achieves a significant improvement in aeration stability and product appearance by adding increasing levels of stabilizer tot he product. Higher levels of stabilizer are known to increase aeration stability and decrease the number and size of the bubbles in the product. However, in the past, the amount of stabilizer could not be increased without making the product too firm. Now, as a result of the reduced viscosity imparted by roll milling or extrusion, the level of stabilizer can be increased while the desired rheology of the product is maintained. Moreover, by use of certain crystal modifiers, the levels of stabilizer can be further increased in whipped products. The preferred stabilizer is a fully hydrogenated mid-fraction of palm oil which is high in PSP and PSS triglycerides.

We have further discovered that additional improvements in whipped appearance are possible by improving the process by which the gas dispersion is formed. This includes ensuring that all gas is dissolved before dispersion, by providing sufficient residence time at high pressure (usually the dispersion pressure) after introducing the gas into the product stream. Additionally, the quality of the dispersion initially formed is improved by providing as sharp a pressure drop as possible across the dispersion valve or orifice. Specifically, increasing the dispersion pressure and employing a slot-shaped dispersion orifice results in smaller and more uniform bubble sizes, and less streaking or discoloration resulting from bubble size variation in the bulk product. Static in-line mixers after dispersion have also been found to enhance bubble and color uniformity.

It is an object of the present invention to:

a. Provide a fluid, reduced fat peanut butter product with a bimodal particle size distribution (PSD). This encompasses both whipped (aerated) and nonwhipped low fat peanut butters.

b. Provide a process for producing (low viscosity) reduced fat peanut butter by extrusion roasting or by further processing (high shear mixing) defatted and roll milled peanut solids before combining with full fat peanut paste and/or oil. High shear (colloid) mixing the low fat peanut solids/paste/oil mixture results in additional viscosity reduction.

c. Provide a reduced or regular fat whipped peanut butter product with superior appearance and aeration stability. This product is formulated with the maximum level of stabilizer possible while achieving target penetration. Preferably the stabilizer is the high PSP/PSS palm oil fraction described herein. At least 90% of the bubbles in the whipped peanut butter have a diameter less than 150 microns, preferably less than 100 microns.

d. Provide a process for producing the superior whipped peanut butter. The appearance is further improved by forming finely dispersed gas bubbles by fully dissolving the nitrogen gas into the product stream under high pressure, and sharply releasing the pressure across an orifice or valve. The valve or orifice design has a significant effect upon the finished product appearance. At least 90% of the bubbles have a diameter less than 150 microns, preferably less than 100 microns.

All ingredient composition percentages given are by weight unless otherwise noted. All size distributions (particles and bubble) are by volume basis.

SUMMARY OF THE INVENTION

The invention is a reduced fat nut or oilseed butter composition which contains:

(a) from about 40% to about 67% nut solids, between 65% and 80% of said solids having a particle size less than 18 microns and a SPAN of greater than 2.5 and not more than 5.0 (preferably greater than 2.5 and not more than 3.5);

(b) from about 33% to about 45% oil;

(c) from 0% to about 4% stabilizer;

(d) from 0% to about 40% bulking agent;

(e) from 0% to about 8% flavorant; and (f) from 0% to about 3% emulsifier;

wherein the product has a Casson plastic viscosity of between 1 and 15 poise and a yield value below 300 dynes per square centimeter (preferably less than 100, more preferably less than 50 dynes/cm$^2$). The invention also relates to a reduced fat or full fat composition identical or similar to that described above which is whipped to contain dispersed gas bubbles, where at least 90% of the bubbles have a diameter less than 150 microns. Processes for making these compositions are also described.

DETAILED DESCRIPTION OF THE INVENTION PRODUCTS

The present invention relates to fluid, reduced fat nut or oilseed butter compositions and fluid, reduced fat nut or oilseed butter pastes, preferably peanut butter and peanut paste, having improved flavor. While this invention will be generally described in terms of peanuts and peanut butter, it should be readily apparent that other materials such as almonds, pecans, walnuts, cashews, filberts, macadamia nuts, brazilians, sunflower seeds, sesame seeds, pumpkin seeds and soybeans could be utilized in this invention. The term "nut" as used herein encompasses these nuts and oil seeds. Mixtures of these nuts and oil seeds can also be used.

The term "nut butter" as used herein, means a spreadable food product made from nut solids and oil, and encompasses spreads and purees. Nut butters according to the present invention will contain from about 40% to about 60% nut solids. Reduced fat nut butters of this invention will contain from about 33% to about 45% oil, while regular fat (not reduced fat) nut butters will contain from about 45% to about 55% oil, the remainder being additives, e.g., stabilizers, flavorants, emulsifiers and bulking agents.

Nut butter includes, but is not limited to the terms "peanut butter" and "peanut spread" as these are defined by the standards of identity of the Food and Drug Administration.

The oil used in the composition can be the oil which naturally comes from the nut or seed during the grinding and defatting step. Oils such as soybean oil, palm oil, cottonseed oil, coconut oil, walnut oil and other suitable oils can also be used herein to make the nut butter. Preferably, for peanut butter, peanut oil is used. Up to about 35% peanut oil can be used in the present invention. With other products, such as the sunflower seeds and other nuts, mixtures of oils may be preferred for flavor. During the defatting process some oil is released from nut solids.

Low calorie oils and zero calorie oils such as sucrose polyesters of long chain fatty acid (olestra) and other polyol polyesters of fatty acids can be used (see for example U.S. Pat. No. 3,600,186 to Mottson, et al and U.S. Pat No. 4,005,196 to Jandacek). Mixed triglycerides made from medium and long chain saturated and/or unsaturated fatty acids can also be used herein. An oil which contains at least 10% medium chain triglycerides can also be used. Medium chain triglycerides are saturated fatty acids having from six to twelve carbon atoms. Reduced calorie peanut butters containing medium chain triglycerides are described in U.S. Pat. No. 4,863,753 (Hunter, et al., 1989).

The products of the present invention contain from 0% to about 3% stabilizer if no crystal modifier is used. Aerated products can contain up to 4.0% stabilizer if a crystal modifier is used. Suitable crystal modifiers are highly lipophilic (HLB about 3.5 or lower), are essentially oil soluble, are non-ionic, and are solid at room temperature (i.e., 70° F. 21.1° C.). Suitable crystal modifiers including sorbitan tristearate (e.g., SPAN 65), polyglycerol esters and sucrose esters. Suitable polyglycerol esters have from 2 to 5 (preferably 2 to 3) glycerol moieties, are essentially completely esterified (e.g., at least about 85% of the hydroxyl groups are esterified), and contain saturated fatty acid ester groups having from 2 to 24 carbon atoms (preferably from 16 to 18 carbon atoms). The saturated fatty acid ester groups for these polyglycerol esters can be derived from hardened cottonseed oil, palm oil, tallow, soybean oil, corn oil, and peanut oil. A particularly preferred polyglycerol ester for use in the present invention is diglycerol tetrastearate. Suitable sucrose esters for use in the present invention have 2 to 8 saturated fatty acid ester group (preferably 2 to 5 ester groups) containing from 16 to 18 carbon atoms, preferably derived from hardened tallow fatty acids. These crystal modifiers are typically included at levels of from about 0.05% to 0.5%.

The stabilizer can be any of the known peanut butter stabilizers, for example, hydrogenated rapeseed oil, or other hydrogenated triglycerides having a high proportion of C-20 and C-22 fatty acids. (See for example, U.S. Pat. Nos. 3,597,230 and 3,192,102.) Stabilizers are usually triglycerides which are solid at room temperature. They solidify in the nut butter in specific crystalline states and keep the oil from separating. These materials can be mixed with a second hydrogenated oil having an iodine value of less than 8, for example hydrogenated palm oil, canola oil, soybean oil, rapeseed oil, cottonseed oil, coconut oil, and similar materials. This stabilizer can also be mixed with lower melting fat fractions as, for example, the peanut butter stabilizer composition disclosed in U.S. Pat. No. 4,341,814 (1982).

The stabilizer used in the nut butters of the invention is preferably a tailored beta-prime stable hardstock terms a "PSP/PSS" hardstock, as disclosed in U.S. Pat. No. 4,996,074 to Seiden & White, issued Feb. 26, 1991 (incorporated by reference herein). This beta-prime stable hardstock comprises: (a) from about 40% to about 98% of 2-Stearoyldipalmitin (PSP) triglycerides; (b) from about 2% to about 55% of 1-Palmitolydistearin (PSS) triglycerides; (c) less than about 7% of tripalmitin (PPP) triglycerides; (d) less than about 25% of tristearin (SSS) triglycerides; (e) less than about 3% of diglycerides; (f) less than about 30% of total PPP plus SSS triglycerides; and (g) less than about 10% of the fatty acids of the total triglycerides and diglycerides being unsaturated.

"P", as used herein, is palmitic acid. "U", as used herein, is an unsaturated fatty acid having 18 carbon atoms. "S", as used herein, is stearic acid. Processes for making the hardstock are described fully at column 3, line 61 to column 7, line 11 of the Seiden & White patent. The hardstock preferably is a fully hydrogenated mid-fraction of palm oil high in PSP and PSS triglyceride components. The hardstock can also be derived from cottonseed stearine and other source oils. The PSP/PSS hardstock is preferably used in the nut butters of this invention at a level of about 1.0% to about 2.5% by weight of the nut butter, preferably from about 2.0% to about 2.5%.

Highly hydrogenated high erucic acid rapeseed oil which is shown in Example VI of the Seiden & White patent is an example of a beta-prime tending hardstock particularly suitable for use in the present nut butters in combination with the PSP/PSS hardstock. When the PSP/PSS hardstock is used in combination with highly hydrogenated (Iodine Value less than 20, preferably less than 10) high erucic acid (preferably at least about 40%) rapeseed oil, it should be used in ratios of PSP/PSS hardstock:high erucic acid rapeseed oil of from about 30:1 to about 10:1, preferably from about 27:1 to about 20:1. The high erucic acid rapeseed oil is more fully discussed in the Seiden & White patent at column 7, line 50 to column 8, line 14.

Sufficient hardstock should be added to achieve a final product penetration (firmness) in the range of about 240-320 millimeters/10 at 21° C., preferably about 280-320.

In addition to the stabilizer, or in lieu thereof, up to about 3% emulsifier can be used in the nut butters to achieve the proper texture. The emulsifier can be any food compatible emulsifier such as mono-diglycerides (e.g., Myverol), lecithin, sucrose monoesters, polyglycerol esters, sorbitan esters, polyethoxylated glycols and mixtures thereof. Up to about 3% and preferably from 1% to 3% stabilizer and/or emulsifier is used.

The nut butters of the invention can optionally contain up to about 8% flavorants. "Flavorants," as the term is used herein, are agents which contribute to or enhance the flavor of the nut butter. These include sweeteners, flavor enhancers, artificial sweeteners, natural and artificial flavors, and other additives which contribute to the flavor of the butter or spread. Sweeteners are selected from the group consisting of sugars, sugar mixtures, artificial sweeteners and other naturally sweet materials. Sugars include, for example, sucrose, fructose, dextrose, honey, molasses, high fructose corn syrup, lactose, maltose, and maltose syrups. Preferably, the sweetener will be something which has a sweetness intensity about that of sucrose or fructose. Sweeteners are added at a level of 0% to about 8%, preferably from about 1% to about 6%.

Artificial sweeteners include compositions such as aspartame, acesulfam, saccharine, cyclamate, glycyrrhizin and other artificial sweeteners. The amount of artificial sweetener used would be that effective to produce the sweetness that is desired; and would be about the equivalent of the addition of from about 1% to 7% of sucrose.

Flavor enhancers include salt or salt substitutes such as potassium chloride, sodium chloride/potassium chloride mixtures, and seasoned salts. The level of flavor enhancer used is a matter of the desired taste level, but usually is from about 0.1% to about 2%. other flavorants include natural or artificial peanut flavors, roasted flavors, and praline/caramel flavors, walnut flavors, almond flavors and flavor compositions.

Nut chunks (including defatted nut chunks), flavored or candied bits and other additives can be mixed with the nut butters of the invention at the desired level. These additives include chocolate chips or bits of other flavored bits, e.g. butterscotch and peanuts, jellies, (either low calorie jellies or regular jelly or preserves), and pralined nuts or other candies. Proteins, such as sunflower seeds, albumin, whey protein, or soy protein, can be added to fortify this low fat product with protein materials. These additives are usually added at a level of from about 1% to about 20% by weight. Unless defatted, nut chunks and flavored bits can contain relatively high levels of fats and oils. Therefore, the addition of these materials can affect the fat content and the calorie level of the nut butter.

Bulking agents can also be used in the nut butters of the invention at levels up to about 40%. Bulking agents add body or texture to the product and are usually non-nutritive or low calorie materials. Polydextrose (from Pfizer Chemicals) and maltodextrin are preferred bulking agents. Fibers, such as cellulose, can also be added. Sugar substitutes which function like sugars but which are non-nutritive can also be used herein. Such sugar substitutes include the 5-C-hydroxyethylaldohexoses described in copending application of Mazur, Ser. No. 190,486 filed May 5, 1988 (now U.S. Pat. No. 5,041,541, issued Aug. 20, 1991). If bulking agents are used, generally from about 5% to 40% bulking agents are added, preferably from about 12% to about 27%.

Processing

To make a nut butter, a nut paste is formed, It is prepared by roasting nuts which have been cleaned to remove all the debris. In some cases the nuts are blanched. Any conventional roasting technique can be used to prepare the nuts for processing.

The roasted nuts are first ground, in a conventional grinder or mill to produce a nut paste of pumpable consistency. The exact particle size and type of mill used are within the skill of the art. A bauer mill is one conventional mill that can be used to make a nut paste.

The nut paste is then defatted, the particle size of the solids reduced, and the solid particles are processed in a high shear mixing device to redistribute the limited amount of oil around the particles, and to liberate additional oil from within the particles to the area between the particles. These steps are defined as follows:

As used herein, the term "defatted" means that some oil or fat is removed from the nut solids. This can be done by a hydraulic press, expeller or other conventional means.

As used herein, the term "particle size reduction" or "means for reducing the particle size" means that the nut particles are further ground or milled or extruded to meet the particle size distribution requirements of this invention.

As used herein, the terms "high shear solids mixing device" or "high shear fluid paste mixing device" or ". . . process" means that the nut particles are process in a manner which redistributes the limited fat and coats each particle more effectively with the fat. Additionally, this high shear mixing step forces oil trapped within the intraparticle network into the interparticle area, where it acts to reduce Casson plastic viscosity.

A. Defatting or Deoiling Step

To make the nut solids having the particle size distribution required by this invention, the nut paste is defatted to about 5% to about 33% total fat content. A hydraulic pres similar to that used to remove cocoa butter from cocoa solids can be used. Any press or similar device used to deoil or defat solids can be used. The term "defatted" does not means that all the fat or oil has been removed. It means that the oil or fat which is easily pressed out of the ground nut paste is removed. The defatted peanut solids will contain between about 15% and about 33% oil, preferably about 23% to 27%, and most preferably about 25%.

The cake or paste which is produced by this defatting process can be made into a powder. Any conventional milling or delumping equipment can be used. Usually the powder has the consistency of coarse flour. Preferably, the deoiled nut cake will pass through a Tyler 28 mesh sieve, or be less than 550 microns in size.

B. Particle Size Reduction

1. Extrusion Roasting

To achieve further particle size reduction, the defatted peanut solids can be fed into a co-rotating twin screw extruder such as a Model MP50 Baker Perkins twin screw extruder. This model has a 25:1 L/D (length/diameter) ratio. The Model MP50 Baker Perkins extruder has a 25 horsepower motor, and it is typically run at 70% of its maximum torque. The flow rate of nut solids through the extruder is about 60 pounds/hour. The shaft is turned at about 215 rpms (the maximum on the extruder is 500). The defatted peanut solids entering the extruder are at ambient temperature. The Specific Mechanical Energy (SME) on the defatted peanut solids during the extrusion process should be between about 0.04 and 0.20 horsepower-hour/pound of solids, preferably between about 0.08 and 0.15, most preferably between about 0.08 and 0.13. Specific Mechanical Energy is calculated by the following formula:

$$\text{Specific Mechanical Energy} = \frac{(\text{Horse power})(\% \text{ Torque})(\text{RPM's})}{\text{Flow Rate}}$$

During extrusion, the mechanical energy imparted to the peanut solids is translated into thermal energy, and the maximum internal temperature rises to from about 170° F. to about 400° F., preferably from about 340° F. to about 370° F. The average residence time is from about 15 to about 160 seconds, preferably from about 45 to about 120 seconds, and most preferably from about 60 to about 100 seconds.

The independent control of work input, product temperature profile and residence time distribution makes the extruder ideally tailored for a product where both the texture (viscosity) and flavor are critical. The combination of high temperature and high shear inherent in the extrusion process provides a product with a lower viscosity than can be achieved by using roll milled or conventionally processed peanuts. For example, extrusion roasting according to the present invention can reduce the viscosity of the peanut solids (after refatting) to about 1000 centipoise, compared to about 5000 centipoise for roll milled peanuts solids.

Based on infrared spectroscopy coupled with principle component analysis and principle component regression, it is believed that the primary mechanism for viscosity reduction in extruded peanut solids is protein conformational changes resulting from the combination of high temperature and high shear. The peanut protein starts out as a mixture of helical (1653 cm$^{-1}$), beat sheet (1635 and 1620 cm$^{-1}$), turns (1676 cm$^{-1}$) and some unordered structures (1647 cm$^{-1}$). See Jackson, Michael, "Fourier Transform Infrared Spectroscopic Studies of Lipids, Polypeptides and Proteins", *Journal of Molecular Structure,* 214 (1989) 329-355 and Surewicz, Witold, "New Insight into Protein Secondary Structure from Resolution-Enhanced Infrared Spectra", *Biochimico et Biophysica Acta,* 952 (1988) 115-130. Due to extrusion, some of the beta structure is lost, probably by unfolding. Under mild extrusion conditions (e.g., a model MP50 Baker Perkins twin screw extruder operated at temperatures between 180° F. and 300° F. and an SME of between about 0.05 and about 0.07 horsepower-hour/pounds of solids) the protein is essentially "softened". The distance between the chains of the sheet are longer and the helical segments and turns are less tightly wound. A new beta structure at about 1624 cm$^{-1}$ is observed. Under more intense conditions (e.g., a Model MP50 Baker Perkins twin screw extruder operated at temperatures of from about 340° F. to about 380° F., and an SME of from about 0.08 to about 0.12), following disruption of the existing structures, new structures are formed ("turn-like" or "helic-like" structure 1680-86 cm$^{-1}$; beta sheet structure 1630-1620 cm$^{-1}$).

2. Roll Milling

Particle size reduction can also be achieved by roll milling. In this case, the nuts are fed to a roll mill such as the five roll Buhler SFL mill manufactured by Buhler Manufacturing of Uzwil, Switzerland. Other mills which can be used include a four roll or five roll Lehman mill manufactured by Lehman Maschinefabrik GMBH, Aalen/Wurtt, Germany. Preferably a five roll mill is used. The more rolls, up to five, that are used on the mill the more efficient the process becomes. Roll diameters of from about 8 inches (20.3 cm) to about 20 inches (50.8 cm) are commonly used.

The granular, defatted nut solids are fed to the roll mill. The feed rate to the mill is controlled by the operating parameters of the mill. Usually the product is "choke" fed to the mill, i.e., the product is constantly fed to the roll mill so that there is always a supply of product in the trough formed by the intake sides of the first nip.

The mills are operated at a zero gap between the rolls. The rolls are pressed together by a hydraulic system and are moved apart by the product. A typical Buhler SFL five roll mill with 900 mm roll length and 40 cm diameter requires a gauge pressure setting of 70 kgm/cm$^2$.

The speed of the rolls is such that the product passes through the rolls and is sheared in an efficient manner. Roll speeds of from about 4 to about 90 revolutions/min. or about 15 to about 375 feet/min. (450 cm/min to 11,250 cm/min) can be used. (These values are based on a 15$\frac{3}{4}$ inch, 39.4 cm, roll diameter). The temperature of the rolls is usually near ambient temperature.

The peanut particles can be passed through the mill a second or a third time to be sure that the particle size distribution is achieved. Additional shearing of the solids is accomplished by additional passes. More than five roll mill passes provides no additional benefit for this invention.

Other particle size reduction methods (i.e., very fine grinding) can also be used.

The particle size reduction process (extrusion or roll milling) of solids having a fat or oil content from about 15% to about 33% results in a monodispersed particle size distribution wherein at least 80% of the solids have a particle size less than 18 microns in size. Usually at least 90% of the solids are less than 13 microns, and most typically the particle size is between 2 and 11 microns and the fat content is from 20% to 33%.

Particle size distribution or polydispersibility can be measured by the SPAN.

SPAN is an abstract, dimensionless width factor defined as:

$$SPAN = \frac{D_{90} - D_{10}}{D_{50}}$$

D$_{90}$ is the diameter of the ninetieth (90th) percentile particles, i.e. 90% of the same would have a smaller particle size. D$_{50}$ and D$_{10}$ are defined in a similar manner and represent the 50th and 10th percentiles respectively. Accordingly, a completely monodisperse particle size distribution whereby D$_{90}$=D$_{10}$ would have a span equal to zero. A SPAN of less than 2.5 defines the monodispersed particle size distribution.

Particle size is measured with an instrument which uses a light scattering technique such as the Malvern particle size analyzer. The method using this instrument is given below. Any light scattering analysis can be used. Because of the nature of these solids, and because of their fat content, the particles cannot be analyzed by conventional sieving or air classification techniques unless all of the fat is removed and the particles are dried to a powder.

The rheology of peanut butter or nut butter in its melted state (stabilizers are in the liquid state) can be characterized by the Casson flow equation with relates rate of shear and stress. This rheological equation may be written as:

$$\sqrt{\tau} = K_0 + K_1 \sqrt{D}$$

where $\tau$=stress, D=shear rate and K$_0$ and K$_1$ are constants. It has been well established that this equation is linear for many solid suspensions such as inks and chocolates. Thus K$_0^2$ and K$_1^2$ can be regarded as measuring yield value and plastic viscosity respectively. The Casson plastic viscosity measures the viscosity of a solid suspension at an infinite shear rate. A Casson plastic viscosity between 1 and 15 poise, preferably between 1 and 5 poise, is preferred for the reduced fat nut butters prepared in this invention.

C. Solids or Paste Shearing Processes

Where the nut solids have been roll milled, high shear mixing of the defatted, milled solids is used to achieve additional reduction of Casson plastic viscosities. These high shear solids mixers include twin screw mixers and extruders. Twin screw mixers made by Readco are suitable for this invention.

The purpose of shearing the solids is to force the particles to grind against each other or against the processor thereby better distributing the oil across the surface of all the particles. Better distribution of the oil across the particles results in an increased wettability of the milled nut solids which facilitates the reconstitution of a low fat paste from peanut solids and peanut oil and/or paste. With a continuous oil film over the nut solids, wettability is enhanced due to the absence of air adsorbed on the solids' surface.

D. Addition of Regular Ground Peanut Paste or Peanut Oil

Next, regular ground peanut past (bimodal PSD) or peanut oil is added to the roll milled or extruded defatted peanut solids. Addition of regular ground peanut paste requires a high shear fluid paste mixing process (e.g., colloid mills). The Casson plastic viscosity of pastes prepared by mixing roll milled defatted peanut solids and regular ground colloid milled peanut paste is between 2 and 15 poise. Preferably the viscosity is minimized, to a range between 2 and 10 poise. Yield values range from about 150 to about 300 dynes per square centimeter. Adding the monodispersed, high shear mixed solids to peanut oil does not require high shear fluid mixing to further reduce the paste viscosity.

Where peanut pastes are made from extruded defatted peanut solids and peanut oil, the Casson plastic viscosity can be as low as 1 poise. Where peanut pastes are made from extruded defatted peanuts and regular ground colloid milled peanut paste, the Casson plastic viscosity is between 2 and 10 poise. Yield values are from about 20 to about 60 dynes per square centimeter.

The combination of the roll milled or extruded defatted peanut solids with the regular peanut paste or peanut oil, results in a reduced fat peanut paste containing between about 33% and about 45% oil and having a particle size distribution such that 65% to 80% of the solids in the paste have a particle size less than 18 microns.

E. Preparation of the Nut Butters

The compositions herein, after being process in a homogenizer, are then mixed with other optional ingredients if all the ingredients are not already in the product. Then the product can be subjected to conventional processing. The product is usually deaerated in a conventional deaerator to remove residual air from the product. This minimizes the oxidative rancidity of the triglycerides present in the nut butter.

The deaerated paste can then be conventionally processed and packaged. This involves processing to crystallize the stabilizer, for example by treatment in a scraped wall heat exchanger and picker. From the picker, the product is filled into packages and usually tempered in the containers for about 2 days at 80° F. (26.6° C.) to 90° F. (32.2° C.) to make sure that the stabilizer is in the proper crystalline form.

Deaerating, cooling, picking and tempering are conventional in peanut butter processing. One skilled in the art can easily adapt these techniques to the nut butters of this invention.

Whipped or stabilized forms of nut butters can also be made with these extruded or milled solids or pastes. Whipped nut butters have from about 5% to about 30% by volume of nitrogen or other inert gas dispersed throughout the nut butter.

While conventional processing for forming whipped toppings can be used to make the whipped or stabilized form of nut butters, it is preferred to treat the nut butter with nitrogen under pressure. The paste is warmed to between 140° F. and 160° F. and then deaerated by passing through a vacuum deaerator. The warmed deaerated paste is pumped at approximately 100 to 300 psig pressure, preferably 200 to 250 psig (pounds per square inch gauge). Then dry nitrogen or other inert gas such as carbon dioxide, helium, etc., is injected into the hot deaerated paste at a pressure of 280 to 340 psig. Preferably, the level of nitrogen or inert gas is between about 5% and about 30%, more preferably between about 15% and about 25%, and most preferably about 20% by volume.

The nut butter is then chilled by passing through scraped wall heat exchanger to about 75° F. to 95° F. The product becomes whipped when it is allowed to expand through a nozzle or valve to ambient pressure and filled into the jar. The nut solids of this invention make a more stable whipped nut butte than conventional nut solids.

Use of the nut solids of the invention provides a fluid non-sticky nut butter at fat levels lower than can be achieved by conventional nut butter processing.

F. Processing for Superior Whipped Appearance

A preferred whipped nut butter of this invention contains well-dispersed, small-sized nitrogen bubbles. The whipped or foam structure of the nut butter is stable and of good consistency. Several factors enter into providing these benefits. First, reduction in viscosity of the defatted nut solids allows the use of more hardstock than could otherwise be used. (Adding more hardstock without reducing the viscosity of the nut solids would result in the final nut butter product being too viscous.) Use of a crystal modifier such as sorbitan tristearate, polyglycerol esters or sucrose esters as previously described also allows the amount of stabilizer to be increased. Crystal modifiers are typically included at levels of from about 0.05 to about 0.5%. The larger amount and the type of hardstock used plays a major role in obtaining a good dispersion of desirably small-sized bubbles.

In addition to using the right type of hardstock in the right amount, the preferred whipped nut butter is processed in such a manner that the desired dispersion of small-sized bubbles is obtained in a stable, well-dispersed foam. The right processing conditions are critical. The first step is to inject nitrogen from a high pressure source into the nut butter such that the level of nitrogen is between 15% and 25%, preferably about 20%, as measured by the density difference between the product with and without whipping. Then it is important to retain the nut butter under a pressure between about 200 and about 300 psig, at a temperature between about 130° F. and about 160° F., for a time between about 2 minutes and about 4 minutes, in order to fully dissolve the gas into the oil phase of the product. Preferably the temperature is between about 140° F. and about 150° F. during this time. The product is next cooled by passing it through two scraped surface heat exchangers where the temperature is reduced to about 85° F. A similar dispersion is obtained by holding the product for about 2 minutes at about 600 psig after the booster pump, described hereinbelow.

The product is then flowed through a booster pump where the pressure is increased to between about 500 psig and about 700 psig, preferably about 600 psig, and the product is then pumped across a specially designed orifice opening where the pressure is quickly relieved to atmospheric pressure. The orifice opening is a slot-shaped dispersion orifice which is used instead of a typical gate valve because the slot-shaped orifice gives a more uniform distribution of small bubbles in the product. Specifically, the design of the slot-shaped orifice is such that the slot is rectangular, with a width of about 0.05 inch. Dispersion pressure is adjusted by varying slot length. Use of the slot-shaped dispersion orifice also eliminates streaking of the product (i.e., streaking with darker colored stripes or swirls). The slot design offers a sharper, more uniform pressure drop than a gate valve. The result is much greater velocity for the same set of operating conditions, resulting in reduced streaks. Static in-line mixers may also be used to reduce streaking.

Lastly, the product is packed into jars and then sealed with a nitrogen headspace.

Casson Viscosity Measurement

A Brookfield Viscometer (HAT series), 5C4-13R chamber with a 8C4-27 spindle is used. This arrangement consists of a spindle "bob" of 0.465 inches (1.12 cm). The inner diameter of the sample cell is 0.750 inches (1.87 cm). The instrument is calibrated at 65° C. and all samples are measured at 65° C.

A sample size of 13.5 grams of peanut butter (unaerated) is placed in the sample cell. The sample cell is then inserted in the jacketed cell holder. To compensate for heat losses through the tubings, etc, the water temperature entering the jacketed cell holder should be a few degrees higher than the desired sample temperature of 65° C. After the temperature of the sample has reached 65° C. the sample is pre-sheared for about three minutes at 50 rpm. The speed is then changed to 100 rpm and a measurement taken after the dial reading settles to a constant value. A total of five scale readings are recorded for 100, 50, 20, 10 and 5 rpm. In general, the time before reading should be:

TABLE 1

| RPM | Time Before Reading (Seconds) |
|---|---|
| 100 | 3 |
| 50 | 6 |
| 20 | 15 |
| 10 | 30 |
| 5 | 60 |

The dial reading and rpm are converted into shear stress and shear rate values by multiplying the rpm and dial reading by 0.34 and 17 respectively. A plot of the square root of shear stress vs the square root of shear rate results in a straight line. Readings where the dial pointer goes off scale are ignored. A least squares linear regression is made over the data to calculate the slope and intercept.

This data is used to calculate two values. The first of these is the plastic viscosity which is equal to the slope of the line squared. The plastic viscosity is a measurement of the peanut butter's viscosity at an infinite shear rate. It accurately predicts the resistance to flow in pumping, moving or mixing situations. The Casson plastic viscosity is measured in poise.

The second value is the yield value which is equal to the value of the x intercept (abscissa) squared. The yield value is a measure of amount of force or shear that is necessary to get the peanut butter to start moving. The relationship between the plastic viscosity and the yield value determine how a peanut butter will react in additional processing. The yield value is measured in dynes per square centimeter.

Particle Size Analysis

A Malvern 2600D particle size analyzer with a Commodore computer was used to analyze the particle size of the samples. A small amount (about 0.01 grams) of each sample was placed in a 25 ml test tube and about 15 ml of its acetone are added to it. The sample is dispersed in the acetone by using a vortex mixer. A transfer pipette is then used to add this diluted solution dropwise to the acetone filled cell of the analyzer. The sample is added until the obscuration is 0.2 to 0.3. The obscuration refers to the amount of light which is obscured by the sample because of diffraction and absorption. The instrument reads more accurately when the obscuration is 0.05 to 0.5 and preferably from 0.2 to 0.3 (20% to 30% of the light energy is reduced).

The apparatus is fitted with a 63 mm lens to determine the particle size of the paste. A magnetic stirrer is used to insure that the sample is being dispersed during the readings. Each sample is swept 250 times by the laser for each reading. Each sample was read a minimum of three times with a five (5) minute wait between each reading.

Measurement of Penetration

"Penetration" is a measure of the firmness or consistency of the nut butters of the present invention. Penetration is determined by measuring the distance a given weight (47 grams) of defined shape will penetrate the nut butter after falling from a height of 2 centimeters above the surface of the nut butter. The penetration of the nut butter is related to its composition and processing, and to the temperature of the sample at the time of measurement. The detailed method for measuring penetration is described in U.S. Pat. No. 4,996,074 to Seiden & White, issued Feb. 26, 1991, at column 25, line 65 to column 27, line 63 (incorporated by reference herein). Penetration is measured in units of millimeters/10 at 21° C.

EXAMPLE 1

This example produces a fluid, bimodal, reduced fat whipped peanut butter product.

The following ingredients are used:

| Ingredient | Weight Percent |
|---|---|
| Peanut Paste (at 52% oil) | 41 |
| Peanut Solids (at 21% oil) | 38 |
| Sucrose | 6 |
| Salt | 1.4 |
| Peanut Oil | 11 |
| PSP/PSS Hardstock* | 2 |
| Rapeseed Hardstock* | 0.1 |
| Lecithin | 0.5 |

*The PSP/PSS hardstock is prepared as in Example V of U.S. Pat. No. 4,996,074 (Seiden & White) (I.V. <1.0), and the rapeseed hardstock is fully hydrogenated high behenic (45%) rapeseed oil prepared as in Example VI (I.V. <10) of the same patent.

The peanuts are lightly roasted at about 420° F. to a Hunter L-color of about 47 in a Jetzone fluidized bed roaster, and then cooled to ambient temperature. The cooled peanuts are blanched, color sorted, and then ground into a paste in a Bauer mill or other conventional peanut grinder. The oil content of the paste is 52%.

The peanut paste stream is then split with one part of the stream being fed to a Carver Model 12-22D hydraulic press. The paste is defatted in the hydraulic press down to a level of 20–25% fat. The defatted peanut cakes that come out of the press are milled to a flour-like consistency in a Fitz mill.

The defatted, milled peanut solids are next fed to a twin screw extruder through a volumetric K-Tron feeder. The twin screw extruder is a Model MP50 Baker Perkins extruder having a 25:1 L/D ratio (length-/diameter). The extruder has a 25 horsepower motor, and it is run at 70% of its maximum torque. The flow rate of the peanut solids through the extruder is 60 pounds/hour. The RPM's of the extruder is 215 (out of 500 maximum). The Specific Mechanical Energy imparted to the peanut solids during extrusion is about 0.12 horsepower-hour/pound of solids. The residence time of the solids in the extruder is about a minute total, and the peanut solids are at a temperature of about 360° F. for about 30 seconds during extrusion. (The peanut solids as they enter the extruder are at ambient temperature, and as they are extruded, they heat up to about 360° F.) After undergoing extrusion (and after refatting to 42.5% fat), the peanut solids have a plastic viscosity of about 4.5–5.0 poise, a yield value of about 25–35 dynes/cm$^2$, and a Hunter L-color of about 40. Approximately 75% of the peanut solids have a particle size less than 18 microns and a SPAN greater than 2.5

The other part of the peanut paste stream is homogenized (in a Gaulin 2-stage homogenizer) and then passed through a colloid mill (A Greerco Model M-500 mill) to reduce the viscosity of the paste to about 1000–1500 centipoise. The oil content of the paste is 52%. This other paste stream is then mixed together at the exit of the extruder with the peanut solids that have been defatted and extruded. At this point the oil content of the combined peanut paste/solids stream is 37%. The combined peanut paste/solids stream is then mixed together with the sucrose, salt, and additional peanut oil. This mixture is passed through a colloid mill (Greerco Model M-500) for additional mixing and viscosity reduction (to about 3000 centipoise).

Next, the PSP/PSS hardstock, rapeseed hardstock and emulsifier are mixed together with the other ingredients to make the final peanut butter formulation. The peanut butter is then deaerated under vacuum to remove oxygen.

Next, nitrogen is injected into the peanut butter from a high pressure source to a density of about 0.93 g/cc (the peanut butter contains 20% (by volume) of nitrogen). The peanut butter is then held under a pressure of about 200 psi for about 4 minutes, and at a temperature of about 150° F., in order to fully dissolve the nitrogen into the oil phase of the product. The nitrogenated peanut butter is then chilled in two scraped surface heat exchangers where the temperature of the peanut butter is reduced to about 85° F. The product then flows through a booster pump where the pressure is increased to about 600 psi. Then the peanut butter is pumped across a specially designed orifice valve opening where the pressure is quickly relieved to atmospheric pressure. The peanut butter product is packed into jars and then sealed under a nitrogen headspace.

The overall time of the process is about 16 hours (roasting—about 4 hours; defatting—about 2 hours; extruding —about 3 hours; mixing of ingredients and colloid milling—about 4 hours; mixing of hardstock— about 1 hour; nitrogen injection and jar sealing—about 2 hours).

EXAMPLE 2

This example produces a fluid, bimodal, reduced fat whipped peanut butter product. The product is prepared according to Example 1, except that the level of PSP/PSS hardstock is increased to 3.4% by weight and 0.1% by weight of sorbitan tristearate is also added. The emulsifier (lecithin) is also not present.

EXAMPLE 3

This example produces a reduced fat, whipped peanut butter product. The fluid, bimodal PSD product resulting from this process is not dependent upon whipping. This product is produced on a semi-continuous pilot-scale process, with measures taken to ensure processing from peanut roasting to finished product packaging does not excess 18 hours.

About 1000 lbs. of whole, medium runner type peanuts are roasted in a fluidized-bed type roaster to a Hunter L-color of about 42. This relatively dark color is necessary to offset the increase in L-color associated with whipping, especially finely dispersed whipped products. The roasted nuts are then split and blanched, sorted to remove remaining wholes and hearts, and color sorted. The nuts are then ground into a paste using a 2-stage grinding procedure, a Bauer mill followed by a texturizer, to achieve a Hegman grind gauge of about 20. The oil content of the roasted, ground paste is about 52%.

The roasted, ground peanut paste is then split into two streams. About 700 lbs. of the peanut paste is pressed in a Carver Model 12-22D hydraulic cocoa butter press for 10 minutes at 5000 psi, expelling peanut oil from the paste. (A portion of this expelled oil is later used without further processing for formulation.) After pressing, the resulting peanut cake (about 350 lbs.) contains about 25% oil. These peanut solids are next Fitz milled to a flour-like consistency. This product is passed three times through a 5-roll Buhler mill fitted with 15.75 inch (39.3 cm) diameter rollers that are 900 mm wide. The rollers are at 30° C. temperature. The feed to the mill is at a rate that the rolls always have nut solids on them. The rate is 2000 lbs/hour in the first pass and 3000 lbs/hour in subsequent passes (this is a result of differences in solid bulk density between the first and second pass). The differential roll speeds are as in Table I. The rolls are set at 0 gap, and a feed gap having a gauge pressure of 70 kg/cm$^2$ and a top roll pressure of 33 and 27 kg/cm$^2$. After roll milling, at least 80% of the defatted peanut solids have a particle size of less than 18 microns (i.e., they are monodispersed).

TABLE I

| Roll | Speed | |
|---|---|---|
|  | Rev./Min. | Ft./Min. |
| 1 | 4 | 16 |
| 2 | 13 | 52 |
| 3 | 34 | 139 |
| 4 | 58 | 239 |
| 5 | 82 | 338 |

The roll milled peanut solids are then processed through a Readco type mixer configured for high shear, where the solids flowrate through the mixer is about 400 lbs/hr and the motor draws about 16 amps. Peanut paste, from the stream which was not pressed to remove oil, is added at the end of the Readco barrel at the ratio of 1.7:1 (paste:solids). The oil content of the exiting peanut paste stream is about 42%, and the peanut paste has a particle size such that 65–80% of the solids have a particle size less than 18 microns.

The paste and solids mixture is then processed through a colloid mill to finish the viscosity reduction process. This entails recirculating about 300 lbs. of the 42% fat peanut paste through the colloid mill, a brine cooled heat exchanger to remove the 50°–70° F. temperature rise, and back into a stirred tank from which the colloid mill is fed. The colloid mill gap is set such that the outlet temperature does not exceed 155° F., and the motor load is kept at about 6.0 amps. The viscosity of the 42% oil paste is reduced from a Casson plastic viscosity of about 8.0 to about 4.0 in six passes through the colloid mill at a flow rate of 6.0–6.5 lbs/min. The paste has a SPAN of about 3–3.5.

The resulting low viscosity, 42% fat paste is used in the following formulation. A 300 lb. batch of 42.5% fat peanut butter is formulated in an 80 gal. Hamilton kettle with the following composition:

| (42% fat) Peanut Paste | 85.40% |
|---|---|
| Peanut Oil | 5.35% |
| Sugar | 6.00% |
| Salt | 1.40% |
| Dry Molasses | 0.50% |
| Stabilizer: | |
| *PSP/PSS Hardstock | 0.80% |
| Emulsifier: | |
| Lecithin | 0.35% |

| | |
|---|---|
| Myverol | 0.20% |

*Prepared as in Example V of U.S. Pat. No. 4,996,074.

The paste, salt, sugar, and dried molasses powder are mixed and heated to about 140° F. in the kettle before adding the molten stabilizer/emulsifier/peanut oil mixture. The mixture is then processed at about 15 lbs/min through a Gaulin dairy homogenizer at 3000 psig into a 100 ga. Hamilton kettle. The product is then ready for processing through the finishing system, where deaeration, hardstock crystallization, and nitrogen incorporation and dispersion take place before packaging.

The finishing system is continuously operated at a flowrate of 7.8 lbs/min (468 lbs/hr). The product is first deaerated through a versator under 20-25 inches (Hg) vacuum. Nitrogen is injected following deaeration such that 15%/volume is measured by density difference. The nitrogen line pressure is 250 psig, and the product line pressure is 140 psig. The product is then cooled from about 140° F. to about 85° F. through three scraped surface heat exchangers (freezers) in series, with −5° F. brine countercurrent on the shell side. Following the freezing step, the line pressure is increased from 100 to 300 psig through a Northern pump. The nitrogen gas is finally dispersed into the product by relieving the pressure across a ¾ in. gate valve, and filled via a 2-stage filler into 18 oz. peanut butter jars. The residence time between the pump and valve is less than 0.5 min. The product is capped and sealed under a nitrogen headspace, and tempered at 80° F. for 24 hours. The product contains about 15% nitrogen by volume. The product has a Casson plastic viscosity of about 4.0 and a yield value of about 155. The nitrogen bubbles in the whipped product have a size such that 90% are less than 300 microns.

EXAMPLE 4

The following example produces a low fat aerated peanut butter product that is significantly improved in aerated appearance relative to conventional aerated peanut butters, especially relative to reduced fat aerated peanut butters formulated without the given high PSS and PSP palm oil mid-fraction hardstock, and most especially relative to full fat aerated peanut butters without the given hardstock.

Specifically, peanuts are roasted, split, blanched, and sorted in a similar fashion as in Example 3. Peanuts are ground into a paste and pressed to remove oil as described in Example 3. The resulting peanut solid flour has an oil content of about 24%.

In this example, we have improved whipped appearance by increasing the hardstock stabilizer level in the product so that the dispersed gas bubbles are more quickly and effectively stabilized from coalescence (growth) after dispersion. The PSP/PSS hardstock prepared as in Example V of U.S. Pat. No. 4,996,074 (Seiden & White) (I.V.<1.0) is used. In addition, rapeseed hardstock (Iodine Value<10) (prepared as described in Example VI of the above-mentioned Seiden & White patent) is added to the palm hardstock at a ratio of 25:1 palm:rapeseed. Addition of the palm and rapeseed hardstocks at the increased level greatly improves the high temperature stability of the gas dispersion. Without this addition, the dispersed gas bubbles will grow in size as the product temperature is increased from ambient to above 90° F. This high temperature stability is believed to be enhanced by the relatively higher melt point of the rapeseed hardstock.

Increasing the given hardstock level in the formula must be in combination with a peanut paste viscosity reduction is the finished product penetration is desired to remain in the target range. Therefore, this example presents the best case of minimizing the reduced fat peanut butter viscosity and maximizing the level of the given hardstock such that the penetration remains in the target range of 240-320 millimeters/10 at 21° C.

The viscosity of the defatted solids and oil paste is reduced relative to that in Example 3 by three primary process modifications. The first modification simply eliminates the paste addition step at the exit of the Readco mixer. The solids are combined with the extracted peanut oil to the desired fat level in the Hamilton kettle. Colloid milling is not necessary for this product, as no further reduction in viscosity is achieved beyond that obtained by the roll mill and Readco mixing steps.

The viscosity of the peanut solids and oil-based peanut butter is further reduced by increasing the number of five roll mill passes from 3 to 5, and increasing the amperage (related to work input) through the Readco mixer from 16 to 30 amps. The oil is not added at the Readco mixer exit, helping increase the work imparted to the solids in this step. The total flowrate of solids through the Readco mixer is identical to Example 3. After these processing steps, the peanut solids are mixed with oil to form a paste. The paste has a Casson plastic viscosity of about 3.0 poise and a yield value of about 50 dynes per square centimeter.

A further reduction in aerated appearance is achieved by the following process improvements. Following nitrogen injection and before dispersion, the incorporated gas phase must be completely dissolved into the oil phase in the peanut butter. This becomes increasingly difficult as nitrogen level and product viscosity increase. Completely dissolving the gas before dispersion ensures that bubble formation occurs into the oil phase and not into another bubble, which is the easier route. This is believed to be partially responsible for uneven and relatively large bubble sizes in previous products. In the present example, this complete gas dissolution is achieved by providing enough product residence time at elevated pressures before dispersion. The exact conditions necessary to achieve this must be determined for each product, as solubility kinetics are largely determined by the product physical properties and processing conditions.

For this example, no further benefit (as measured by reductions in bubble size) is realized beyond increasing the residence time between the booster pump and dispersion valve (with pipe) from less than 0.5 minutes to about 2 minutes, and increasing the pressure over this portion of the system from 300 to 500 psig. A similar product is produced by providing about 4 minutes of residence time after nitrogen injection and before freezing instead of about 2 minutes after the pressure boost and before dispersion.

We have discovered that dispersion valve design improves the uniformity of gas bubble size in the bulk product after dispersion. This is easily observed by an improvement in color uniformity throughout the product. As the mean dispersed bubble size is decreased in the product, the product becomes noticeably light in color. Especially for more finely dispersed products, any variation in bubble size from one area of the product to another will result in a streak or discoloration. Thus, it is advantageous to optimize the uniformity of the dispersion throughout the product.

Two means have been found to improve the uniformity of dispersion, or reduce streaking or discoloration. The first is to form a more uniform dispersion initially, and the other is to average out these nonuniformities after dispersion. Dispersion through a slotted orifice, rectangular in design with an entrance width of about 0.05 inch, is found to provide the most uniform dispersion in this example. The nitrogen is dispersed into the peanut butter to make a whipped product, by providing a rapid pressure drop through this slotted orifice from a pressure of about 600 psig to a pressure of about 0 psig. Static mixers, preferably 4 Koch type SMX elements placed in-line after the dispersion valve, will effectively eliminate streaking and discoloration in this example. The whipped product contains about 15% by volume dispersed nitrogen, dispersed as bubbles having a size such that 90% are less than 100 microns in diameter.

The peanut butter is formulated as described below in a 500 lb. total batch size, then finished, packaged and tempered as described in Example 3, while incorporating the process and product modifications just described hereinabove.

| Formula: | |
| --- | --- |
| Peanut solids | 66.00% |
| Peanut oil | 24.00% |
| Sugar | 6.00% |
| Salt | 1.40% |
| *PSP/PSS hardstock | 2.50% |
| *Rapeseed hardstock | 0.10% |

*The PSP/PSS hardstock is prepared as in Example V of U.S. Pat. No. 4,996,074 (Seiden & White) (I.V. <1.0), and the rapeseed hardstock is fully hydrogenated high behenic (45%) rapeseed oil prepared as in Example VI (I.V. <10) of the same patent.

The whipped peanut butter product has a penetration of about 300 millimeters/10 at 21° C. The product contains about 42% oil.

What is claimed is:

1. A reduced fat nut or oilseed butter composition comprising:
   (a) from about 40% to about 67% roasted nut solids, between 65% and 80% of said solids having a particle size less than 18 microns and a SPAN of greater than 2.5 and not more than 5.0;
   (b) from about 33% to about 45% oil;
   (c) from 0% to about 4% stabilizer;
   (d) from 0% to about 40% bulking agent;
   (e) from 0% to about 8% flavorant; and
   (f) from 0% to about 3% emulsifier;
wherein the product has a Casson plastic viscosity of between 1 and 15 poise and a yield value below 300 dynes per square centimeter.

2. A product according to claim 1 having a Casson plastic viscosity of between 1 and 10 poise and a yield value below 100 dynes per square centimeter.

3. A product according to claim 2 having a Casson plastic viscosity of between 1 and 5 poise and a yield value below about 50 dynes per square centimeter.

4. A product according to claim 1 wherein said solids have a SPAN of greater than 2.5 and not more than 3.5.

5. An aerated product according to claim 1 which contains from about 5% to about 30% inert gas.

6. An aerated product according to claim 5 which contains from about 15% to about 25% inert gas.

7. An aerated product according to claim 6 which contains about 20% inert gas.

8. An aerated product according to claim 5 comprising from about 1% to about 4% stabilizer.

9. An aerated product according to claim 8 which additionally contains from about 0.05% to about 0.5% of a crystal modifier for said stabilizer, said crystal modifier being selected from the group consisting of sorbitan tristearate, polyglycerol esters having from 2 to 5 glycerol moieties and essentially completely esterified with saturated fatty acid ester groups having from 2 to 24 carbon atoms, and sucrose esters containing from 2 to 8 saturated fatty acid ester groups having from 16 to 18 carbon atoms.

10. An aerated product according to claim 9 wherein the crystal modifier is sorbitan tristearate.

11. An aerated product according to claim 9 wherein the crystal modifier is diglycerol tetrastearate.

12. An aerated product according to claim 8 comprising from about 2% to about 2.5% stabilizer.

13. An aerated product according to claim 5 wherein the inert gas is nitrogen.

14. An aerated nut or oilseed butter composition comprising:
   (a) from about 40% to about 67% roasted nut solids;
   (b) from about 33% to about 55% oil;
   (c) from about 1% to about 4% stabilizer;
   (d) from 0% to about 40% bulking agent;
   (e) from 0% to about 8% flavorant;
   (f) from 0% to about 3% emulsifier; and
   (g) from about 5% to about 30% inert gas;
wherein the product has a Casson plastic viscosity of between 1 and 15 poise and a yield value below 300 dynes per square centimeter; and wherein the aerated product contains dispersed bubbles of the inert gas, at least about 90% of said bubbles having a diameter less than 150 microns.

15. An aerated product according to claim 14 which additionally contains from about 0.05% to about 0.5% of a crystal modifier for said stabilizer, said crystal modifier being selected from the group consisting of sorbitan tristearate, polyglycerol esters having from 2 to 5 glycerol moieties and essentially completely esterified with saturated fatty acid ester groups having from 2 to 24 carbon atoms, and sucrose esters containing from 2 to 8 saturated fatty acid ester groups having from 16 to 18 carbon atoms.

16. An aerated product according to claim 15 wherein the crystal modifier is sorbitan tristearate.

17. An aerated product according to claim 15 wherein the crystal modifier is diglycerol tetrastearate.

18. An aerated product according to claim 14 comprising from about 33% to about 45% oil wherein at least 80% of said nut solids have a particle size less than 18 microns.

19. An aerated product according to claim 18 having a Casson plastic viscosity prior to aeration of between 1 and 10 poise and a yield value below 100 dynes per square centimeter.

20. An aerated product according to claim 19 having a Casson plastic viscosity prior to aeration of between 1 and 5 poise and a yield value below 50 dynes per square centimeter.

21. An aerated product according to claim 18 wherein said nut solids have a SPAN of greater than 2.5 and not more than 3.5

22. An aerated product according to claim 18 comprising from about 2% to about 2.5% stabilizer.

23. An aerated product according to claim 22 comprising about 2.5% stabilizer.

24. An aerated product according to claim 18 wherein the stabilizer is a beta-prime stable tailored triglyceride hardstock comprising:
 (a) from about 40% to about 98% of 2-Stearoyldipalmitin (PSP) triglycerides;
 (b) from about 2% to about 55% of 1-Palmitolydistearin (PSS) triglycerides;
 (c) less than about 7% of tripalmitin (PPP) triglycerides;
 (d) less than about 25% of tristearin (SSS) triglycerides;
 (e) less than about 3% of diglycerides;
 (f) less than about 30% total PPP plus SSS triglycerides; and
 (g) less than about 10% of the fatty acids of the total triglycerides and diglycerides being unsaturated;
 wherein P=palmitic acid and S=stearic acid.

25. An aerated product according to claim 24 wherein the stabilizer comprises the beta-prime stable triglyceride hardstock of claim 23 and a highly hydrogenated high erucic acid rapeseed oil in a ratio of from about 30:1 to about 10:1.

26. An aerated product according to claim 18 wherein the product has a penetration between 280 and 320 millimeters/10 at 21° C.

27. An aerated product according to claim 18 wherein at least about 90% of said bubbles have a diameter less than 100 microns.

28. An aerated product according to claim 18 which contains from about 15% to about 25% inert gas.

29. An aerated product according to claim 28 which contains about 20% inert gas.

30. An aerated product according to claim 18 wherein the inert gas is nitrogen.

31. A process for preparing a reduced fate, fluid peanut paste comprising:
 (a) defatting roasted and ground nut solids to an oil content between about 15% and about 35%; then
 (b) extrusion roasting the nut solids to reduce the particle size of the defatted nut solids so that at least about 80% of said nut solids have a particle size of less than 18 microns; then
 (c) combining the extrusion roasted nut solids with peanut oil or ground undefatted nut solids containing between about 45% and about 55% oil and having a bimodal particle size distribution wherein one distribution curve is composed of particles in the range of 18 to 118 microns and the second particle size distribution range is primarily between 3 and 14 microns, to provide a reduced fat peanut paste containing between about 33% and about 45% oil and having a particle size distribution such that 65% to 80% of the solids in the paste have a particle size less than 18 microns;
 wherein the peanut paste product has a SPAN greater than 2.5 and not greater than 5.0.

32. The process of claim 31 wherein said extrusion roasting step (b) is carried out at a Specific Mechanical Energy of from about 0.04 to about 2 horsepower-hour/pounds of solids, a temperature from about 170° to about 400° F., and a residence time of from about 15 to about 160 seconds.

33. The process of claim 32 wherein the Specific Mechanical energy is from about 0.08 to about 0.13 horsepower-hour/pounds of solids, the temperature is from about 340° to about 370° F., and the residence time is from about 60 to about 100 seconds.

34. A process according to claim 31 wherein the peanut paste product has a Casson plastic viscosity between 1 and 8 poise.

35. A process according to claim 34 wherein the peanut paste product has a Casson plastic viscosity of between 1 and 5 poise.

36. A process according to claim 35 which further comprises the step of exposing the reduced fat peanut paste to high shear rates to minimize the Casson plastic viscosity of the paste.

37. A process according to claim 36 wherein the exposure to high shear rates is conducted by colloid milling.

38. A process according to claim 31 wherein the peanut paste product has a SPAN greater than 2.5 and not greater than 3.5.

39. A reduced fat nut of oilseed butter composition according to claim 1 which contains a peanut paste made according to the process of claim 31.

40. A process for preparing a reduced fate, fluid peanut paste comprising:
 (a) defatting roasted and ground nut solids to an oil content between about 15% and about 33%; then
 (b) reducing the particle size of the defatted nut solids so that at least about 80% of said nut solids have a particle size of less than 18 microns; then
 (c) exposing said nut solids to high levels of work input by use of a twin screw extruder or twin screw mixer configured for high shear; then
 (d) combining said nut solids with ground, undefatted peanut paste containing between about 45% and about 55% oil and having a bimodal particle size distribution wherein one distribution curve is composed of particles in the range of 18 to 118 microns and the second particle size distribution range is primarily between 3 and 14 microns; resulting in a reduced fat peanut paste containing between about 33% and about 45% oil and having a particle size distribution such that 65% to 80% of the solids in the paste have a particle size less than 18 microns; then
 (e) exposing the reduced fat peanut paste to high shear rates to minimize the Casson plastic viscosity of the paste;
 wherein the peanut paste product has a SPAN greater than 2.5 and not greater than 5.0.

41. A process according to claim 40 wherein the peanut paste product has a Casson plastic viscosity between 1 and 15 poise.

42. A process according to claim 41 wherein the peanut paste product has a Casson plastic viscosity between 2 and 10 poise.

43. A process according to claim 42 wherein the particle size reduction of step (b) is conducted by multiple pass roll milling.

44. A process according to claim 40 wherein the high work input of step (c) is conducted by one or more passes through a Readco mixer.

45. A process according to claim 40 wherein the exposure to high shear rates in step (e) is conducted by colloid milling.

46. A process according to claim 40 wherein the peanut paste product has a SPAN greater than 2.5 and not greater than 3.5.

47. A reduced fat nut or oilseed butter composition according to claim 1 which contains a peanut paste made according to the process of claim 40.

48. A process for preparing a superior appearance aerated peanut butter product comprising:
- (a) preparing a peanut paste having a Casson plastic viscosity between 2 and 15 poise from roasted peanuts; then
- (b) making a peanut butter by combining from about 73% to about 99% peanut paste of step (a), from about 1% to about 4% stabilizer, from 0% to about 40% bulking agent, from 0% to about 8% flavorant, from 0% to about 3% emulsifier, and from 0% to about 35% peanut oil, wherein these ingredients are selected so that the final aerated peanut butter product has a penetration between 240 and 320 millimeters/10 at 21° C.; then
- (c) deaerating the peanut butter, and then injecting under pressure an inert gas into the peanut butter so that the final aerated peanut butter product contains between 5% and 25% by volume inert gas; then
- (d) providing sufficient residence time at high pressure after injecting the gas to ensure that the gas is completely dissolved in the peanut butter, wherein the residence time is between about 2 minutes and about 4 minutes and the pressure is between about 200 psig and about 600 psig; and then
- (e) providing a rapid pressure drop from a region of high pressure between 300 psig and 800 psig, to a region near ambient pressure between 50 psig and 0 psig, to disperse the gas into the peanut butter and make an aerated peanut butter product;

wherein the aerated product contains dispersed bubbles of the inert gas, at least about 90% of said bubbles having a diameter less than 300 microns.

49. A process according to claim 48 wherein the final aerated peanut butter product comprises from about 33% to about 45% oil and wherein at least 80% of said nut solids have a particle size less than 18 microns.

50. A process according to claim 49 wherein the residence time in step (d) is between about 2 minutes and about 2½ minutes and the pressure in step (d) is between about 500 psig and about 600 psig.

51. A process according to claim 49 wherein the final aerated peanut butter product has a penetration between 280 and 320 millimeters/10 at 21° C.

52. A process according to claim 49 wherein the peanut paste of step (a) has a Casson plastic viscosity between 2 and 10 poise.

53. A process according to claim 49 wherein the peanut butter of step (b) contains from about 2% to about 3% stabilizer.

54. A process according to claim 49 wherein the stabilizer is a beta-prime stable tailored triglyceride hardstock comprising:
- (a) from about 40% to about 98% 2-Stearoyldipalmitin (PSP) triglycerides;
- (b) from about 2% to about 55% 1-Palmitolydistearin (PSS) triglycerides;
- (c) less than about 7% tripalmitin (PPP) triglycerides;
- (d) less than about 25% tristearin (SSS) triglycerides;
- (e) less than about 3% diglycerides;
- (f) less than about 30% total PPP plus SSS triglycerides; and
- (g) less than about 10% of the fatty acids of the total triglycerides and diglycerides being unsaturated;

wherein P=palmitic acid and S=stearic acid.

55. A process according to claim 54 wherein the stabilizer comprises the beta-prime stable triglyceride hardstock of claim 54 and a highly hydrogenated high erucic acid rapeseed oil in a ratio of from about 30:1 to about 10:1.

56. A process according to claim 49 wherein at least about 90% of said bubbles have a diameter less than 100 microns.

57. A process according to claim 49 wherein the final aerated peanut butter product contains between 10% and 20% by volume inert gas.

58. A process according to claim 49 wherein the inert gas is nitrogen.

59. An aerated nut or oilseed butter composition according to claim 14 which is made according to the process of claim 48.

60. An aerated nut or oilseed butter composition according to claim 18 which is made according to the process of claim 49.

* * * * *